United States Patent
Adelmann et al.

(10) Patent No.: US 8,201,708 B2
(45) Date of Patent: Jun. 19, 2012

(54) METHOD AND APPARATUS FOR THE CONTINUOUS CONTROLLED DISCHARGE OF SOLIDS

(75) Inventors: Dieter Adelmann, Kulsheim (DE); Stefan Gerl, Werbach (DE)

(73) Assignee: Maschinenfabrik Gustav Eirch GmbH & Co. KG, Hardheim (DE)

( * ) Notice: Subject to any disclaimer, the term of this patent is extended or adjusted under 35 U.S.C. 154(b) by 614 days.

(21) Appl. No.: 11/587,709

(22) PCT Filed: Apr. 1, 2005

(86) PCT No.: PCT/EP2005/051481
§ 371 (c)(1),
(2), (4) Date: Sep. 14, 2007

(87) PCT Pub. No.: WO2005/105288
PCT Pub. Date: Nov. 10, 2005

(65) Prior Publication Data
US 2008/0244986 A1  Oct. 9, 2008

(30) Foreign Application Priority Data
Apr. 28, 2004 (DE) .................. 10 2004 020 790

(51) Int. Cl.
*B67D 1/00* (2006.01)
(52) U.S. Cl. .................. 222/54; 222/1; 222/55; 222/57; 222/63; 222/270; 222/280; 222/305; 198/550.6; 198/671; 110/110; 73/73

(58) Field of Classification Search ............... 222/1, 52, 222/63, 265–290, 305, 54–58; 110/110; 198/550.6, 663, 671; 73/73
See application file for complete search history.

(56) References Cited

U.S. PATENT DOCUMENTS

| | | | | |
|---|---|---|---|---|
| 1,726,812 A * | 9/1929 | Eggert | ................... | 222/134 |
| 1,960,072 A * | 5/1934 | Turner | ................... | 110/198 |
| 2,865,848 A * | 12/1958 | Ramella | ................ | 208/165 |
| 3,201,005 A * | 8/1965 | Buhr et al. | .............. | 222/272 |
| 4,008,740 A * | 2/1977 | Chermack | ............. | 141/100 |
| 4,580,698 A * | 4/1986 | Ladt et al. | .............. | 222/55 |

(Continued)

FOREIGN PATENT DOCUMENTS
FR    2506918    12/1982

OTHER PUBLICATIONS
International Search Report, Application No. PCT/EP2005/051481, 2 pages, Jul. 21, 2005.

*Primary Examiner* — Kevin P Shaver
*Assistant Examiner* — Andrew P Bainbridge
(74) *Attorney, Agent, or Firm* — Dinsmore & Shohl LLP (57) ABSTRACT

A silo has more than one discharge passage, and each passage has the ability to increase or decrease its respective flow rates. The silo and each portion of the silo that feeds into each individual discharge passage can measure a feature of the solid being dispensed, such as its moisture content or its temperature. A computer controller is then used to take this feedback and adjust the rate of flow from each discharge passage so that the flows from each passage are kept the same despite the variation in moisture, temperature or any other characteristic of the flowing solid. A method to utilize this device is also taught.

33 Claims, 9 Drawing Sheets

U.S. PATENT DOCUMENTS

| | | | |
|---|---|---|---|
| 4,590,795 A * | 5/1986 | Oetiker et al. | 73/73 |
| 4,595,125 A * | 6/1986 | Alwerud | 222/55 |
| 4,896,795 A * | 1/1990 | Ediger et al. | 222/63 |
| 5,018,648 A * | 5/1991 | Gmur | 222/272 |
| 5,154,326 A * | 10/1992 | Chang et al. | 222/196 |
| 5,694,413 A * | 12/1997 | Durr et al. | 373/79 |
| 5,810,206 A * | 9/1998 | Bruggendick et al. | 222/145.5 |
| 6,311,847 B1 * | 11/2001 | Soldwish-Zoole et al. | 209/156 |
| 6,871,757 B2 * | 3/2005 | Bennington et al. | 222/1 |
| 6,966,456 B2 * | 11/2005 | Margalit | 222/1 |

* cited by examiner

METHOD AND APPARATUS FOR THE CONTINUOUS CONTROLLED DISCHARGE OF SOLIDS

TECHNICAL FIELD

The present invention concerns a method of discharging a solid from a silo with a polygonal or round discharge cross-section, wherein the solid flows continuously through the silo.

The invention further concerns a discharge apparatus for a solids silo having a polygonal or round discharge cross-section, as well as a solids silo, wherein the silo is designed for a solid to flow therethrough.

STATE OF THE ART

In regard to the metered withdrawal from silos with a rectangular or square discharge opening, it is known that, when using a screw conveyor in which the screw is of a constant core and outside diameter and has a constant screw pitch, the bulk material is withdrawn only at the rearward end of the silo while a dead zone is formed in the forward region of the silo. By virtue of adaptation of the screw geometry, for example by a reduction in the core diameter in the conveyor direction and an increase in the outside diameter or the screw pitch, the screw can pick up bulk material along the entire discharge cross-section, SCHULZE, Dietmar. Grundlagen und Möglichkeiten der Schüttguttechnik. Schüttgut—Informationen für die Schüttgutindustrie (Agrichema GmbH).

DE 3717748 (ZIPPE GMBH U. CO, 6980 WERTHEIM) May 26, 1987 discloses a plate heat exchanger for preheating bulk materials, in which the problem of an irregular withdrawal of solid material at the lower end of the heat exchanger is avoided by symmetrically arranged outlet shafts with flange-mounted, non-controllable shaker conveyors of equal conveyor output.

In the case of bulk materials which flow very poorly, those known measures nonetheless frequently still result in a non-homogeneous mass flow of the solid material over the cross-section of the apparatus. If the solid material in the silo is at the same time heated or cooled or if a reaction takes place during the flow of solid material therethrough, then the unequal mass flow can result for example in locally different temperatures and thus different product properties.

DE 3214472 (EIRICH, HUBERT ET AL) Apr. 20, 1982 discloses a controllable discharge apparatus for an apparatus for heating electrically conductive bulk materials, in which the discharge speed and the electrical heating power are matched to each other in order to achieve a temperature which is as constant as possible in the discharged product.

In apparatuses for heating electrically conductive bulk materials by means of resistance heating by way of oppositely disposed electrodes, the power input at the electrodes is dependent on the resistance of the bulk material disposed therebetween. As the current which is passed through the bulk material has a tendency to flow along the path of least resistance, when dealing with an irregular mass flow across the cross-section of the silo-form apparatus, that results in temperature differences between regions which are flowing more quickly and more slowly. Particularly in a situation involving changing flow properties in respect of the intake substances, due for example to changing intake temperature, material moisture content or particle size distribution, there is hitherto no possible way of influencing the locally different discharge speed, which arises as a result thereof, from the solids silo.

DISCLOSURE OF THE INVENTION

The problem of the present invention is to provide a method and a discharge apparatus for a solids silo as well as a solids silo which can be equipped with such a discharge apparatus, which permit a controllable solids discharge which is regular over the cross-section of the silo, and thus permit the production of bulk materials which are treated physically or chemically when flowing through the silo, being in particular heated or cooled, with properties which are as homogeneous as possible, in particular with slight temperature differences. In addition in its preferred configuration the invention permits automatic adaptation to changing flow properties in respect of the intake substances used.

The silo discharge according to the invention divides the withdrawal cross-section or discharge cross-section into a plurality of preferably mutually equal partial cross-sections, to each of which a respective continuous controllable discharge member is flange-mounted. The solids flow issuing from the controllable discharge members can be collected together for example by means of a continuous conveyor device disposed therebeneath and removed.

The uniform discharge of solid material at the continuously operating discharge members is in that case controlled in dependence on measurement signals from a plurality of similar sensors which detect the locally prevailing mass flow or another measurement parameter in the corresponding partial portions of the silo, by way of the conveyor delivery of the discharge member associated with the respective sensor.

To detect the local mass flow, for example the electrical power input at an electrically heated sensor can be used to maintain a preset temperature at the sensor tip, GERL, Stefan et al, Sensor auf Transistorbasis zur In-line-Restfeuchtemessung in ruhenden Haufwerken, Technisches Messen. 1997, Vol 64, No 7/8, pages 268-275, or, in the case of electrically conductive bulk materials, the current strength at oppositely disposed electrodes.

The local energy input of heat exchangers through which fluid or vapour flows can also be detected and utilised as a signal for the local mass flow.

Furthermore the solids mass flow can be ascertained directly in each discharge member associated with a partial portion of the silo by means of weighing in respect of each discharge member in conjunction with the respective discharge speed of the discharge member.

In addition, in the case of silos through which the material flows continuously, the mass flow is adapted to the feed mass flow of the feed member, by way of the rotary speed of the discharge members, in such a way that the filling level within the silo remains constant during the flow therethrough.

The uniform controllable removal of material permits for example uniform heating/cooling of the product over the entire cross-section of the silo without locally different product temperatures. At the same time the capacity of the heat transfer arrangement can also be fully utilised.

As an alternative thereto control of the discharge speeds of the individual discharge members can be effected by way of measurement of the temperature of the solid. With a uniform heating power in all regions of the silo the solid is heated more greatly in those regions in which it remains for longer. In the case of heating power which is irregularly distributed over the cross-section, some regions are heated more greatly and other regions less greatly, at the same height. If now the temperature in the silo or in the region of the discharge members is measured the conveyor speeds of the discharge members can be so adapted that the solid material from all regions is at the same temperature upon being removed from the silo. In other words, the discharge speed is slowed down in a region if the temperature of the solid as measured there is below a predeterminable first reference value and speeded up if the temperature of the solid as measured there is above a second reference value. That overall ensures a uniform discharge temperature for the solid, which is between the first and second reference values (which can also be the same) in all partial cross-sections of the discharge cross-section. In that respect it is possible to use various control procedures which are known in the state of the art such as for example PID control.

BRIEF DESCRIPTION OF THE DRAWINGS

The invention is diagrammatically illustrated by way of example in the drawings in which.

DETAILED DESCRIPTION

Figure 1:
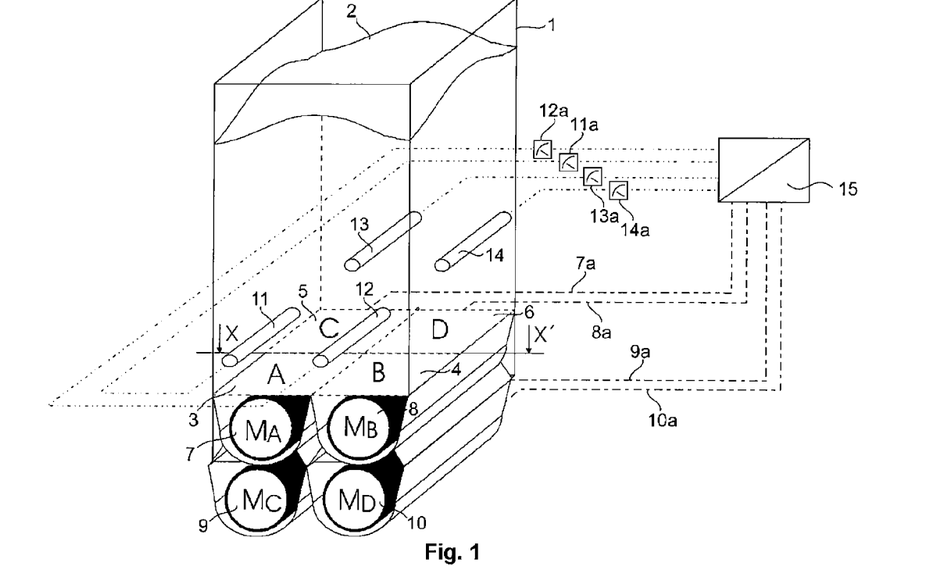
FIG. 1 is a diagrammatic isometric view of a silo which is subdivided into four partial portions, with mass flow sensors, a signal evaluation and control unit and controllable discharge screws.

FIG. 1 shows a rectangular silo 1 with a solids fill 2, the silo 1 being divided in the bottom region into four uniform portions 3, 4, 5 and 6. Each of the portions 3, 4, 5 and 6 has its own continuous controllable discharge device or member 7, 8, 9 and 10, for example a discharge screw, which can continuously remove the solid material 2 from the respective portion. Arranged above each portion 3, 4, 5 and 6 is at least one respective mass flow sensor 11, 12, 13 and 14 associated with the respective portion. Each of the similar sensors 11, 12, 13 and 14 detects the local flow of the solid material fill 2 in the portion in which the measurement field of each sensor is disposed. The signals 11a, 12a, 13a and 14a from the respective sensors 11, 12, 13 and 14 are passed to a signal evaluation and control unit 15. The signal evaluation and control unit 15 produces setting signals 7a, 8a, 9a and 10a for the controllable discharge devices 7, 8, 9 and 10 in such a way that the signals which occur at the sensors 11a, 12a, 13a and 14a and which are proportional to the solid mass flow are of the same magnitude and thus the solid mass flow in each portion is equal.

Figure 2:
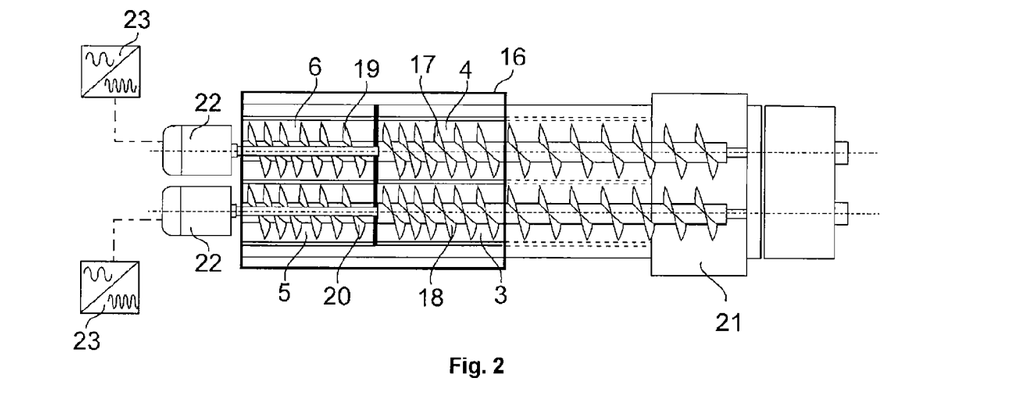
FIG. 2 is a plan view of a rectangular discharge floor of a silo along section X-X' in FIG. 1 with four withdrawal screws with a progressive screw pitch.

FIG. 2 shows a plan view of the discharge bottom of a silo according to the invention along section X-X' in FIG. 1. Over the discharge cross-section of the silo 16 two respective screws 17, 18 are arranged in mutually juxtaposed relationship and two respective screws 17, 19 and 18, 20 are arranged in mutually superposed relationship. The screws can be provided for example with a progressive pitch. In the discharge region 21 into which all screw outlets open, the solid which is withdrawn from the silo drops in the direction of the force of gravity into downstream-disposed installation portions (not shown). To provide for stepless adjustability of the discharge speed of each screw, it is provided with a motor 22 with a frequency converter 23 or an adjusting transmission (not shown). The discharge speed in each portion or partial cross-section of the discharge bottom 3, 4, 5 and 6 of the silo can thus be individually set.

Figure 3:
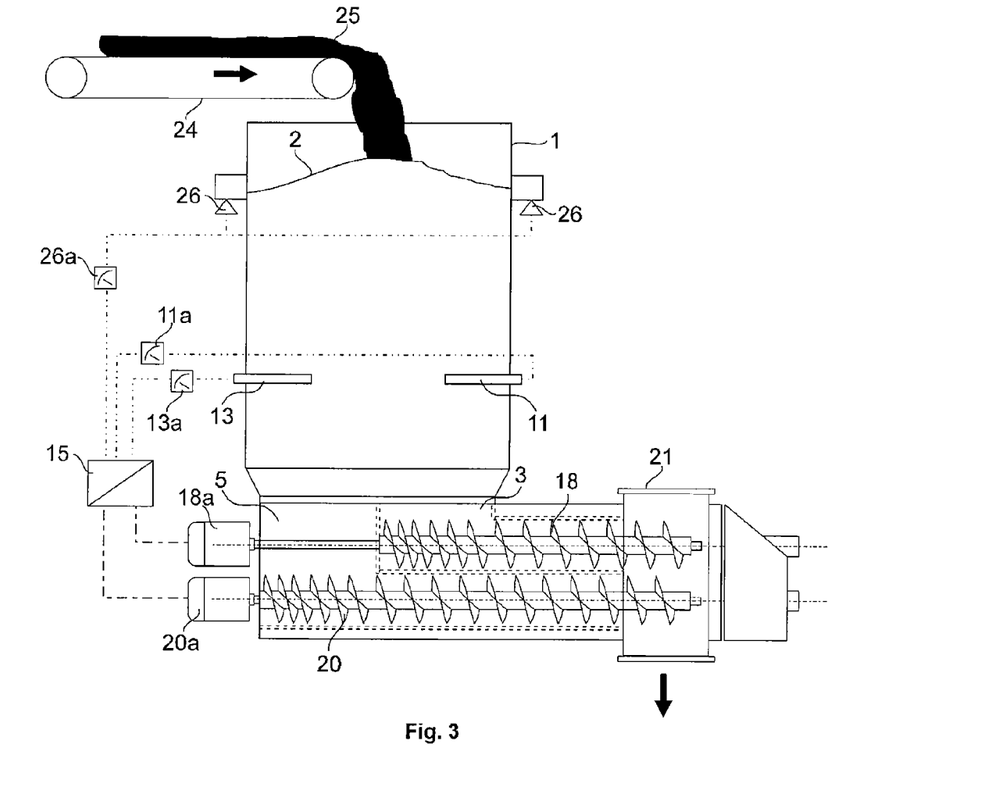
FIG. 3 is a diagrammatic side view of a weighed-out silo through which solids continuously flow, with mass flow sensors, a signal evaluation and control unit and controllable progressive withdrawal screws.

FIG. 3 shows a silo 1 with the discharge bottom according to the invention, solids 2 flowing continuously through the silo.

The silo 1 is charged at the upper end with solids 25 which are pourable, by way of a metering member 24, for example a variable-speed conveyor belt, and the solid is continuously drawn off in the bottom region. In order to be able to maintain a defined degree of filling within the silo and to prevent overfilling, the degree of filling is detected for example by way of a weighing device by means of weighing cells 26.

The measurement signals of the sensors 11 and 13 which are of the same design configuration and which detect the solid mass flow in each portion 3, 5 of the withdrawal region of the silo are detected by means of a signal evaluation and control unit 15, and the filling level within the silo is detected by way of the weighing cells 26. The signal evaluation and control unit 15 controls the speed of the discharge members 18, 20 on the basis of the input signals 11a, 13a and 26a, by way of the controllable drive units 18a, 20a, in such a way that the filling level within the silo remains constant and all solid mass flow sensors 11, 13 register the same level in respect of the measurement signal 11a, 13a.

In a further variant a plurality of discharge members, for example 17+18 and 19+20 or 18+20 and 17+19 can be combined together in terms of control procedures.

In addition, instead of the filling level within the silo, the solids flow 25 which is supplied by way of the metering member 24 and which is determined by measuring procedures can be utilised for controlling the discharge speed of the discharge members 18, 20.

Figure 4:
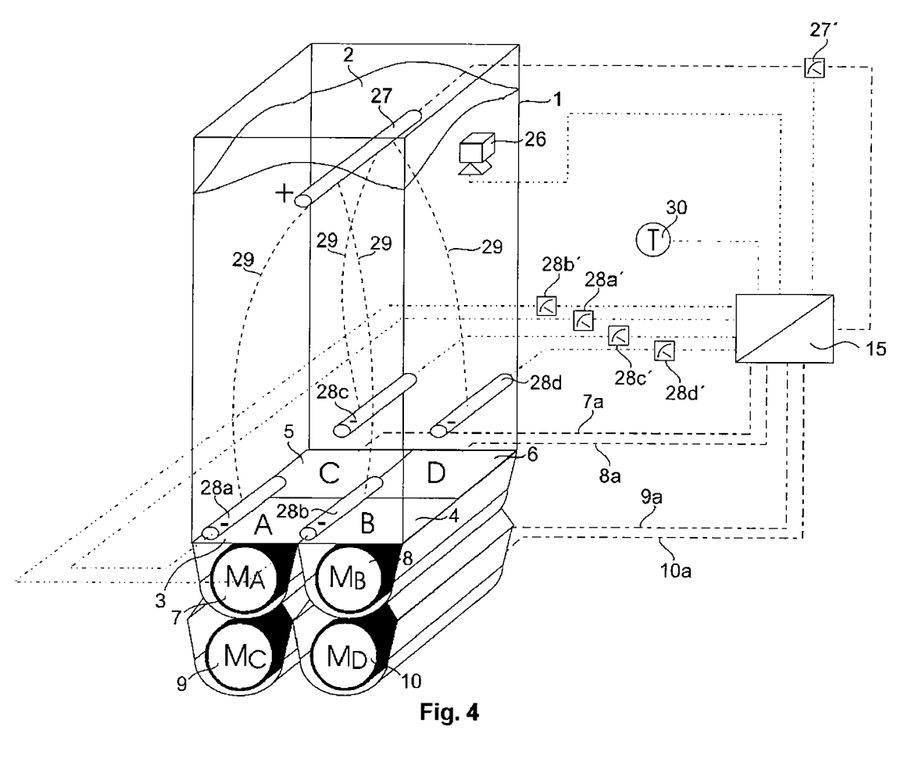
FIG. 4 is a diagrammatic isometric view of a weighed-out silo which is subdivided into four partial portions, with controllable discharge screws, electrodes for heating electrically conductive solids and a signal evaluation and control unit.
Figure 5:
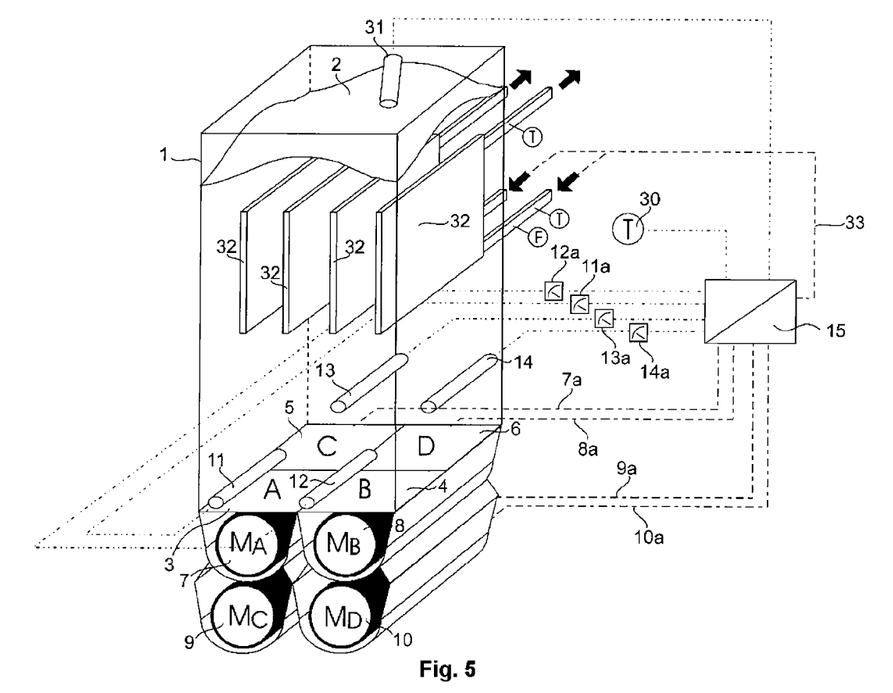
FIG. 5 is a diagrammatic isometric view of a silo which is subdivided into four partial portions, with a filling level sensor, controllable discharge screws, heat exchanger elements, mass flow sensors and a signal evaluation and control unit.

FIG. 4 shows a rectangular silo 1 with a solids fill 2, which is divided in the bottom region into portions 3, 4, 5 and 6. Each of the portions 3, 4, 5 and 6 has a continuous controllable discharge device 7, 8, 9 and 10, for example a discharge screw, which can continuously withdraw the solid 2 from the respective portion. The entire silo 1 is supported on weighing cells 26 in order to ensure a constant degree of filling. Alternatively it is also possible to use filling level sensors 31 (FIG. 5).

In a particularly advantageous configuration of the invention, arranged within the silo 1 in the upper region are one or more, preferably identical electrodes 27 (+pole), over the entire silo cross-section, while arranged in the lower region are one or more, preferably identical electrodes 28a, 28b, 28c and 28d (−pole), above each withdrawal cross-section 3, 4, 5 and 6. The reverse polarity of the electrodes 27 and 28a, 28b, 28c and 28d is equally possible. A current 29 flows between the electrodes and the electrically conductive solids fill 22, the strength of the current 29 being dependent on the resistance and thus the temperature of the solid disposed therebetween. The current strength 27' measured in the input power is divided to the corresponding number of electrodes 28a, 28b, 28c and 28d in the withdrawal region, wherein the measured current strengths 28a', 28b', 28c' and 28d' of each electrode 28a, 28b, 28c and 28d varies in dependence on the resistance of the solid material in each withdrawal portion 3, 4, 5, 6.

The measured current strengths 28a', 28b', 28c' and 28d' of the respective electrodes 28a, 28b, 28c and 28d are passed to a signal evaluation and control unit 15. The current strength 27' at the upper electrode 27 as well as the weight of the silo from the weighing cells 26 together with the measured temperature of the solid material 30 at the discharge region 21 are also fed into the signal evaluation and control unit 15. The signal evaluation and control unit 15 produces setting signals 7a, 8a, 9a and 10a for the controllable discharge devices 7, 8, 9 and 10 in such a way that the current strength 28a', 28b', 28c' and 28d' at the electrodes 28a, 28b, 28c and 28d are of equal magnitude and thus the solid mass flow in each portion is of the same magnitude and in addition the filling level within the silo 1 remains the same.

In addition the signal evaluation and control unit 15 detects the temperature 30 of all the discharged solid and controls the inputted power at the electrodes 27, 28a, 28b, 28c and 28d in such a way that the desired final temperature of the product is achieved at the discharge.

When using a plurality of electrodes within a withdrawal portion the measured current strengths are suitably combined together to form an evaluatable measurement signal.

FIG. 5 shows a variant of FIG. 4 and FIG. 1, in which heating or cooling of the solid within the silo 1 is effected by way of example by way of heat exchanger elements 32 through which pass vapour, thermal oil or cooling fluid and which in a further variant could also be electrically heated. The solid mass flow in each portion 3, 4, 5 and 6 is detected as shown in FIG. 1 by way of a plurality of mass flow sensors 11, 12, 13, 14 and the signals 11a, 12a, 13a and 14a are fed to a signal evaluation and control unit 15 which generates therefrom corresponding setting signals for the discharge devices 7, 8, 9 and 10 as set forth in the description relating to FIG. 1. The power input 33 at the heating or cooling elements 32 within the silo, controllable for example by way of the through-flow of the heating or cooling medium, is effected in dependence on the measured final temperature 30 at the discharge of the withdrawal screws.

Figure 6:
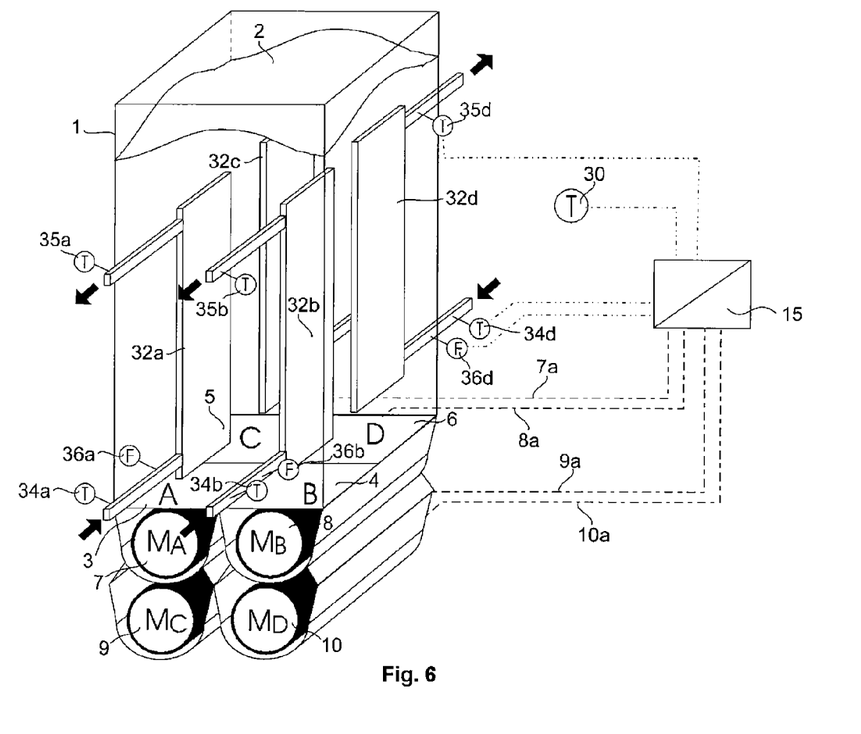
FIG. 6 is a diagrammatic isometric view of a silo which is subdivided into four partial portions, with controllable discharge screws, heat exchanger elements operating as mass flow sensors and a signal evaluation and control unit.

FIG. 6 shows a further variant of FIG. 5, in which the heat exchanger elements 32a, 32b, 32c and 32d through which a heating or cooling medium flows are used at the same time as mass flow sensors insofar as a heat exchanger element 32a, 32b, 32c and 32d, through each of which a respective heating or cooling medium flows, is allocated to each withdrawal portion 3, 4, 5 and 6. Setting signals for the discharge devices 7, 8, 9 and 10 can be produced, in accordance with the description relating to FIG. 1, by way of the cooling medium mass or volume flow 36a, 36b, 36c and 36d which is detected individually for each portion, and the energy input which is ascertained by way of the respective temperature difference between the intake 34a, 34b, 34c and 34d and the outlet 35a, 35b, 35c and 35d, by the signal evaluation and control unit 15.

Figure 7:
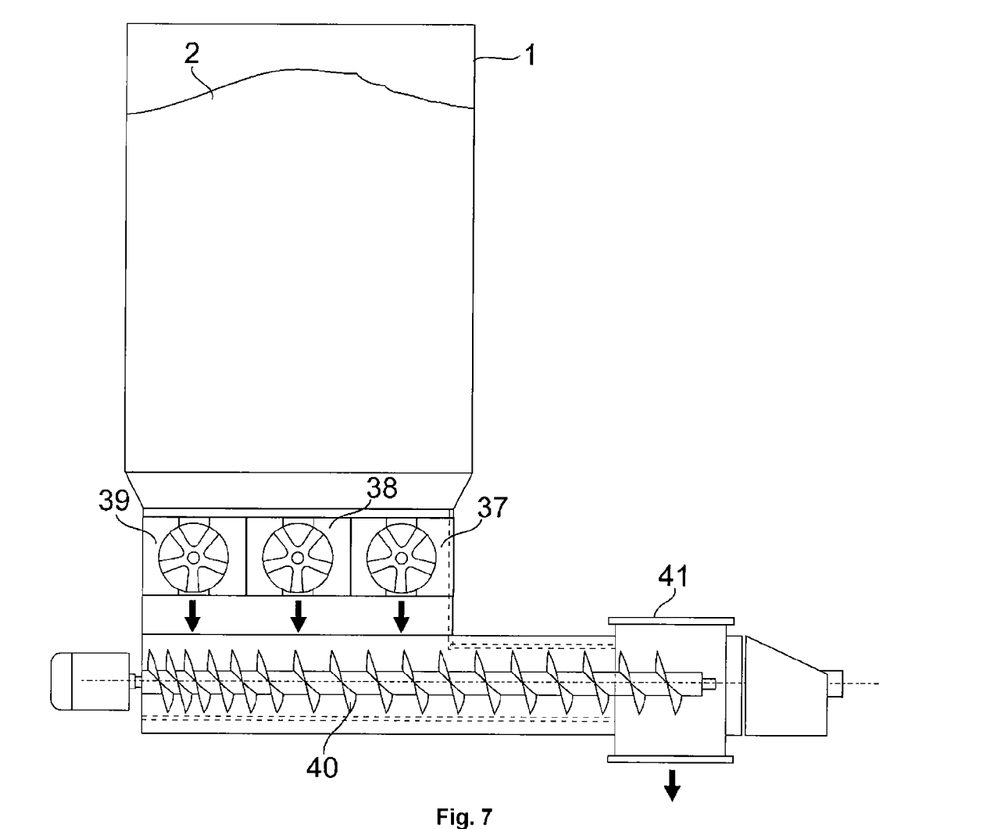
FIG. 7 is a diagrammatic side view of a silo with controllable cell wheel lock devices.

FIG. 7 shows a variant of FIG. 3, in which the discharge of the solid in the partial portions 37, 38 and 39 is effected by way of a plurality of controllable cell wheel lock devices which deliver the discharged solid on to a continuously operating conveyor device 40 which is disposed therebeneath and which combines the individual solid mass flows together and conveys them to a predefined delivery point 41. Control of the discharge speed of the cell wheel lock devices is effected in a similar manner to the foregoing description by way of the mass flow sensors (not shown).

Figure 8:
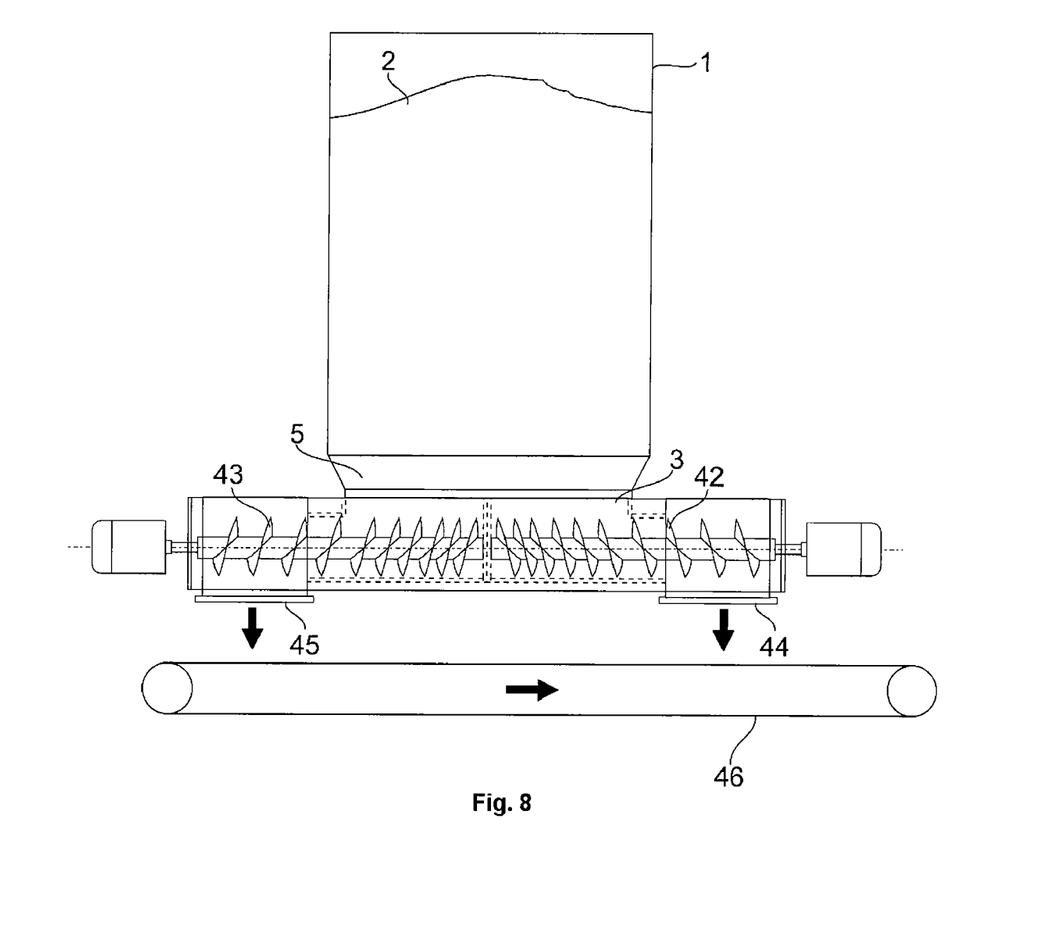
FIG. 8 is a diagrammatic side view of a silo with controllable conveyor screws with oppositely disposed discharge openings.

FIG. 8 shows a further variant of FIG. 3 in which discharge is effected by way of screws 42, 43 which deliver the solid which has been withdrawn from the partial portions 3 and 5, by way of oppositely disposed discharge openings 44 and 45, on to a continuously operating conveyor device 46 which is disposed therebeneath and which combines the individual solid mass flows together and delivers them at a predefined point. In this case also control of the discharge speed of the screws 42, 43 is effected by way of the mass flow sensors (not shown) similarly to the foregoing description.

Figure 9:
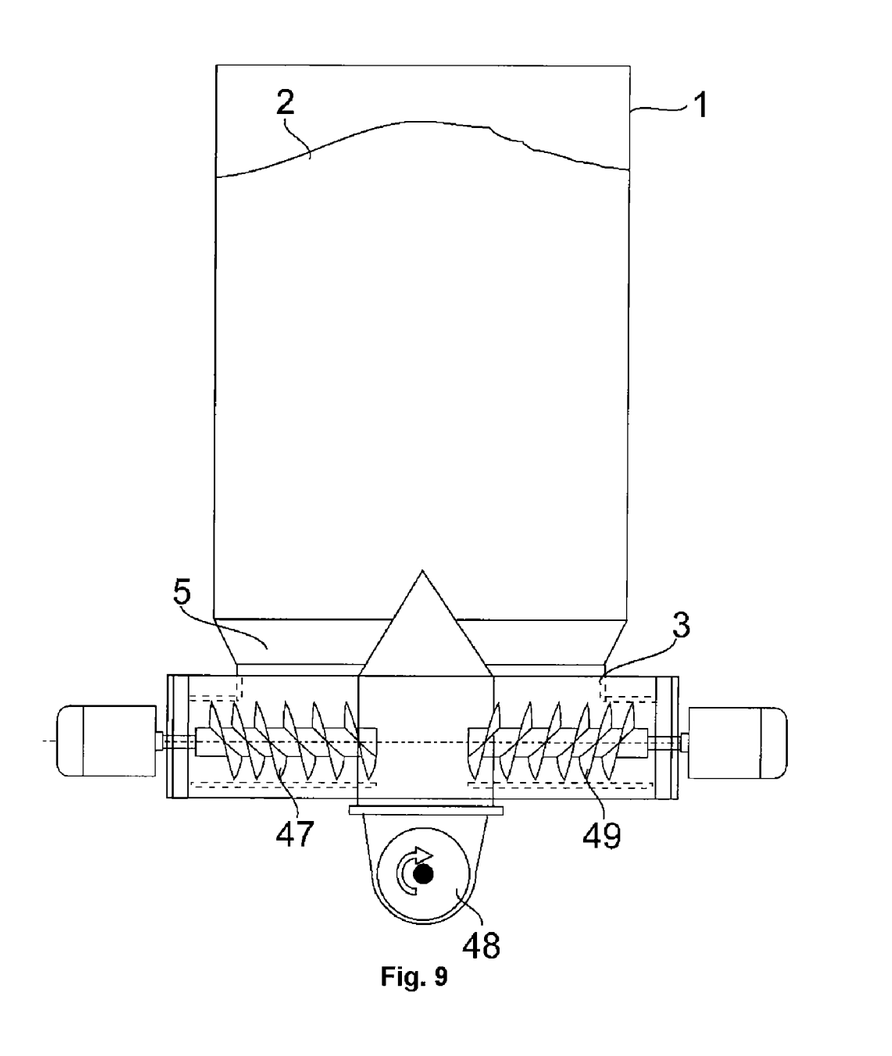
FIG. 9 is a diagrammatic side view of a silo with controllable conveyor screws with a central discharge opening and orthogonally arranged conveyor device.

FIG. 9 shows a further variant of FIG. 8, in which a plurality of withdrawal screws 47, 49 convey the solid which has been withdrawn from the partial portions 3 and 5 respectively towards the middle of the silo 1 and the total solid flow is combined together by an orthogonally arranged continuous conveyor device 48 and transported away to a predefined point.

Figure 10:
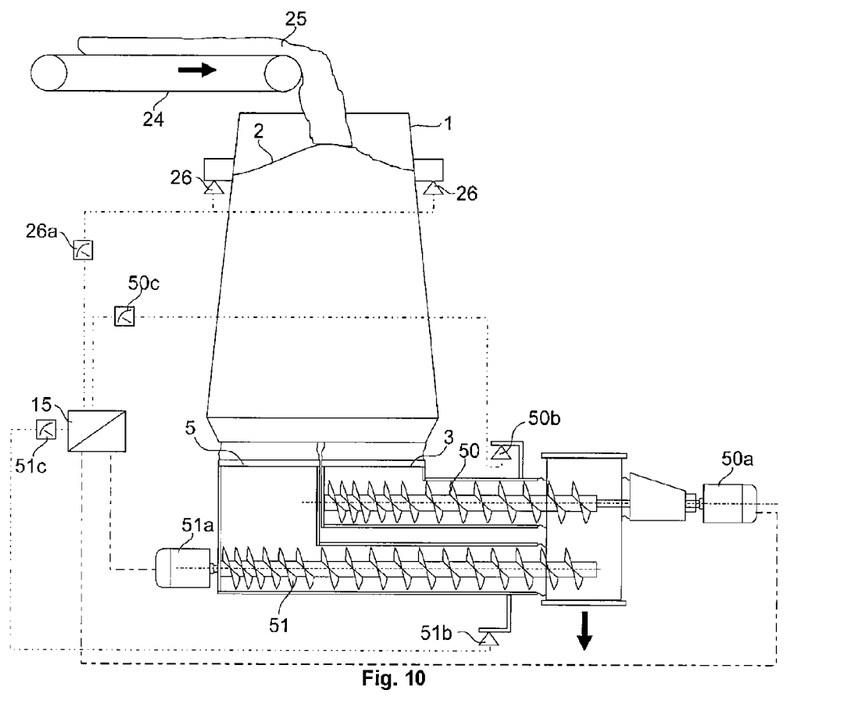
FIG. 10 is a diagrammatic side view of a weighed-out, negatively conical silo through which solids continuously flow, with a signal evaluation and control unit and controllable progressive screw carriages.

FIG. 10 shows a variant of FIG. 3 with a negatively conical silo 1 through which solids 2 continuously flow. The silo 1 is charged with pourable solids 25 at the upper end by way of a metering member 24, for example a variable-speed conveyor belt, and the solid is continuously withdrawn in the bottom region. In order to be able to maintain a defined degree of filling within the silo and to prevent overfilling, the degree of filling is detected for example by way of the weight of the silo, by means of weighing cells 26. Discharge is effected by way of a plurality of screw weighing arrangements 50 and 51.

The negatively conical structural configuration of the silo 1 provides that compacting of the solid 2 in lower layers is counteracted by the weight of the solid material itself. The fill density and thus for example also the electrical resistance of the material fill remain constant over the height involved.

The weights of the conveyor screws 50b and 51b in each portion 3, 5 of the withdrawal region of the silo are detected by means of a signal evaluation and control unit 15 and the solid mass flow of each screw is calculated by way of the speed of the respective screw. In addition, the filling level within the silo is detected by way of the weighing cells 26. The signal evaluation and control unit 15 controls the speed of the discharge members 50, 51, on the basis of the input signals 50c, 51c and 26a, by way of the controllable drive units 50a, 51a, in such a way that the filling level within the silo remains constant and all solid mass flows which are calculated from the weight 50c, 51c and the rotary speeds of the screws 50 and 51 are of the same magnitude. Alternatively to the screw weighing arrangement it is also possible to use a belt weighing arrangement or a weighed-out oscillating or shaker conveyor.

In principle the invention is not limited to the discharge devices set forth but can be carried into effect with any continuously operating and controllable discharge member. The same applies for the continuous conveyor device which is disposed beneath the discharge members and which brings together the solid material flow issuing from the discharge devices and transports it away. Instead of a continuous conveyor device the solid issuing from the discharge members can also be fed directly to an item of equipment connected at a downstream location. The discharge cross-section of the silo is not restricted to a polygonal shape, preferably rectangular or square, but can also be round.

For the purposes of original disclosure it is pointed out that all features which are to be deduced by a man skilled in the art from the present description, the drawings and the claims, even if they were described in specific terms only in connection with given further features, can be combined both individually and also in any combinations with others of the features or groups of features disclosed herein, unless that has been expressly excluded or technical factors make such combinations impossible or meaningless. A comprehensive explicit representation of all conceivable combinations of features is dispensed with here only for the sake of brevity and readability of the description.

We claim:

1. A method of discharging an electrically conductive solid from a silo such that a flow characteristic of said solid that is either different or subject to change while resident therein will become substantially uniform upon discharge, said method comprising:
   configuring a discharge cross-section of said silo to be subdivided into a plurality of partial portions;
   flowing said solid substantially continuously through each of said partial portions;
   heating at least a portion of said resident electrically conductive solid by passing electrical current therethrough;
   determining a temperature of said resident solid within said partial portion on the basis of said electrical current flowing through said electrically conductive solid within said partial portion; and
   separately controlling a discharge speed of said solid flowing through each said partial portion such that said flow characteristic that is dependent upon a combination of said temperature and said discharge speed of a corresponding part of said solid that flows through each said partial portion is substantially uniform with parts of said solid that flows through the remaining ones of said partial portions.

2. The method according to claim 1, wherein a temperature measured by said determining a temperature of said resident solid represents a temperature associated with said solid within each said partial portion.

3. The method according to claim 1, wherein a measurement parameter indicative of a property in respect of said solid is detected within a storage volume defined in said silo.

4. The method according to claim 3, wherein said measurement parameter corresponds to a degree of filling of said silo by said solid.

5. The method according to claim 1, wherein a measurement parameter indicative of a property in respect of said solid is detected in or after said flow of said solid through a discharge region of said silo.

6. The method according to claim 1, wherein said solid is heated or cooled while flowing through said silo.

7. The method according to claim 1, wherein said electrical heating conductor comprises a plurality of electrodes that project into a portion of said silo, and wherein at least one of a current strength between said plurality of electrodes or a temperature of said solid in situations where said solid is electrically conductive is used as said measurement parameter in respect of said solid.

8. The method according to claim 1, wherein local power input into said solid is used as a measurement parameter in respect of said solid.

9. The method according to claim 4, wherein said measurement parameter depends on said solid fed into said silo.

10. The method according to claim 1, further comprising inputting power into a heating or cooling device cooperative with said partial portion of said silo such that said power inputting is controlled at least in part by said temperature of said solid at said respective partial portion of said discharge cross-section.

11. A discharge apparatus for a silo with a discharge opening through which a solid disposed in said silo flows, said discharge apparatus comprising:
    a plurality of separate partial portions, each of which are provided with individual discharge members that are controllable independently of one another,
    a controller,
    devices for detecting a flow characteristic within said silo which represents at least one of a physical or chemical property of said solid and which changes when said solid flows through said silo such that said flow characteristic is configured to be made substantially uniform across each of said plurality of separate portions upon discharge of said solid, and
    at least one measuring device cooperative with said controller and each partial portion such that measurements taken therefrom are used by said controller to achieve said substantially uniform flow characteristics across each of said plurality of separate portions.

12. The discharge apparatus of claim 11, wherein said at least one measuring device comprises a solid flow measuring device.

13. The discharge apparatus of claim 11, wherein said at least one measuring device comprises a temperature measuring device.

14. The discharge apparatus of claim 11, wherein each of said partial portions are of a cross-section which are of substantially the same shape as each other.

15. The discharge apparatus of claim 11, wherein each of said plurality of discharge members are jointly controllable.

16. The discharge apparatus of claim 11, wherein said plurality of discharge members are selected from the group consisting of screws, oscillating conveyors and belts.

17. The discharge apparatus of claim 11, wherein discharge openings of said discharge members are arranged in a substantially opposite relationship.

18. The discharge apparatus of claim 11, wherein said discharge members further comprise a cell wheel lock device.

19. The discharge apparatus of claim 11, wherein said discharge members are selected from the group consisting of screws, oscillating conveyor and belt weighing arrangements.

20. The discharge apparatus of claim 11, wherein said discharge speed of said discharge members is controllable by a frequency converter-operated motor.

21. The discharge apparatus of claim 11, wherein said discharge speed of said discharge members is controllable by an adjusting transmission.

22. The discharge apparatus of claim 11, further comprising a substantially continuously operating conveyor device connected downstream of said discharge members and configured to accept said solid issuing therefrom.

23. A silo designed for a flow therethrough of a solid, said silo having a discharge cross-section such that said silo is designed for a flow therethrough of a solid by means of discharge members connected downstream of said silo, said discharge cross-section being subdivided into a plurality of partial cross-portions, said silo having at least one sensor for detecting a flow characteristic, characterized in that said at least one sensor is designed for detection of said flow parameter within said silo which is representative of a flow rate of said solid, and said discharge members comprising means for being controlled on basis of said flow characteristic.

24. The silo of claim 23, wherein said at least one sensor is disposed within a filling volume defined in said silo.

25. The silo of claim 24, wherein said at least one sensor is disposed in or downstream of at least one of said respective discharge portions.

26. The silo according to claim 23, further comprising at least one device for heating or cooling said solid during flow thereof through said silo.

27. The silo of claim 26, wherein said at least one device for heating or cooling comprises an electrical resistance heating device configured to heat said solid in situations where said solid is electrically conductive.

28. The silo of claim 26, wherein said at least one device for heating or cooling is configured to convey a heat carrier medium which is liquid or in vapour or gas form therethrough for heating said solid during flow thereof through said silo.

29. The silo of claim 26, wherein said at least one device for heating or cooling comprises an electrical heating means for heating said solid during said flow thereof through said silo.

30. The silo of claim 23, wherein a plurality of similar sensors are distributed over a cross-section of said silo and are arranged in association with said discharge portions connected downstream of said various discharge partial cross-sections.

31. The silo of claim 23, further comprising a plurality of sensors arranged within said partial portion and distributed over a height thereof.

32. The silo of claim 23, further comprising at least one discharge member in flowing communication with said solid disposed in said filling volume.

33. The silo according to claim 32, wherein discharge openings coupled to said discharge members are arranged centrally beneath said silo.

* * * * *

UNITED STATES PATENT AND TRADEMARK OFFICE
CERTIFICATE OF CORRECTION

| | | |
|---|---|---|
| PATENT NO. | : 8,201,708 B2 | |
| APPLICATION NO. | : 11/587709 | |
| DATED | : June 19, 2012 | |
| INVENTOR(S) | : Dieter Adelmann et al. | |

It is certified that error appears in the above-identified patent and that said Letters Patent is hereby corrected as shown below:

Title page, item (30);
"DE 10 2004 020 790" should read --DE 10 2004 020 790.9--

Signed and Sealed this
Twenty-seventh Day of November, 2012

David J. Kappos
*Director of the United States Patent and Trademark Office*